US011121986B2

(12) United States Patent
Abitbol et al.

(10) Patent No.: US 11,121,986 B2
(45) Date of Patent: Sep. 14, 2021

(54) GENERATING PROCESS FLOW MODELS USING UNSTRUCTURE CONVERSATION BOTS

(71) Applicant: International Business Machines Corporation, Armonk, NY (US)

(72) Inventors: Roy Abitbol, Zurit (IL); Eliezer Wasserkrug, Haifa (IL); Harold Jeffrey Ship, Mizpe Netofa (IL); Jonathan Bnayahu, Haifa (IL)

(73) Assignee: International Business Machines Corporation, Armonk, NY (US)

(*) Notice: Subject to any disclaimer, the term of this patent is extended or adjusted under 35 U.S.C. 154(b) by 119 days.

(21) Appl. No.: 16/528,681

(22) Filed: Aug. 1, 2019

(65) Prior Publication Data

US 2021/0036974 A1 Feb. 4, 2021

(51) Int. Cl.
*H04L 12/58* (2006.01)
*G06K 9/62* (2006.01)
*G06F 16/335* (2019.01)
*G10L 13/02* (2013.01)
*G10L 13/08* (2013.01)

(52) U.S. Cl.
CPC ............ *H04L 51/02* (2013.01); *G06F 16/335* (2019.01); *G06K 9/6218* (2013.01); *G10L 13/02* (2013.01); *G10L 13/08* (2013.01)

(58) Field of Classification Search
CPC ......... H04L 51/02; G10L 13/02; G10L 13/08; G06K 9/6218; G06F 16/335; G06F 3/0481; G06Q 10/067; G06Q 10/04; G06Q 10/06316; G06Q 10/103; H04M 3/51

See application file for complete search history.

(56) References Cited

U.S. PATENT DOCUMENTS

| 10,469,665 | B1* | 11/2019 | Bell .................... H04L 67/22 |
| 10,554,817 | B1* | 2/2020 | Sullivan ................ G06N 5/02 |
| 2004/0049539 | A1* | 3/2004 | Reynolds ............... G06F 3/165 |
| | | | 709/203 |
| 2004/0088678 | A1* | 5/2004 | Litoiu .................. G06Q 50/04 |
| | | | 717/104 |
| 2009/0287528 | A1* | 11/2009 | Strickland .......... G06Q 10/0633 |
| | | | 705/7.27 |
| 2015/0370467 | A1 | 12/2015 | Holmes-Higgin et al. |
| 2017/0109676 | A1 | 4/2017 | Marcu et al. |
| 2017/0118343 | A1 | 4/2017 | Anisimov et al. |
| 2018/0088564 | A1* | 3/2018 | Billi-Duran ...... G05B 19/41865 |
| 2018/0121841 | A1 | 5/2018 | Harris |

\* cited by examiner

*Primary Examiner* — Benjamin R Bruckart
*Assistant Examiner* — Tien M Nguyen
(74) *Attorney, Agent, or Firm* — Barry D. Blount

(57) ABSTRACT

In an example computer-implemented method, unstructured interactions between an unstructured conversation bot and a plurality of users are logged. A process flow model is generated based on the logged unstructured interactions. Instructions based on the process flow model are presented to a user in real time via the conversation bot.

20 Claims, 7 Drawing Sheets

100

GENERATING PROCESS FLOW MODELS USING UNSTRUCTURE CONVERSATION BOTS

BACKGROUND

The present techniques relate to process flows. More specifically, the techniques relate to optimizing the sequence of a process flow.

SUMMARY

According to an embodiment described herein, a system can include processor to log unstructured interactions between an unstructured conversation bot and a plurality of users. The processor can also further generate a process flow model based on the logged unstructured interactions. The processor can also present, via the conversation bot, instructions to a user in real time based on the process flow model.

According to another embodiment described herein, a computer-implemented method can include logging, via a processor, unstructured interactions between an unstructured conversation bot and a plurality of users. The computer-implemented method can further include generating, via the processor, a process flow model based on the logged unstructured interactions. The computer-implemented method can also further include presenting, via the conversation bot, instructions to a user in real time based on the process flow model.

According to another embodiment described herein, a computer program product for generating process flow models can include computer-readable storage medium having program code embodied therewith. The computer readable storage medium is not a transitory signal per se. The program code executable by a processor to cause the processor to log unstructured interactions between an unstructured conversation bot and a plurality of users. The program code can also cause the processor to generate a process flow model based on the logged unstructured interactions. The program code can also cause the processor to present, via the conversation bot, instructions to a user in real time based on the process flow model.

DETAILED DESCRIPTION

Figure 1:
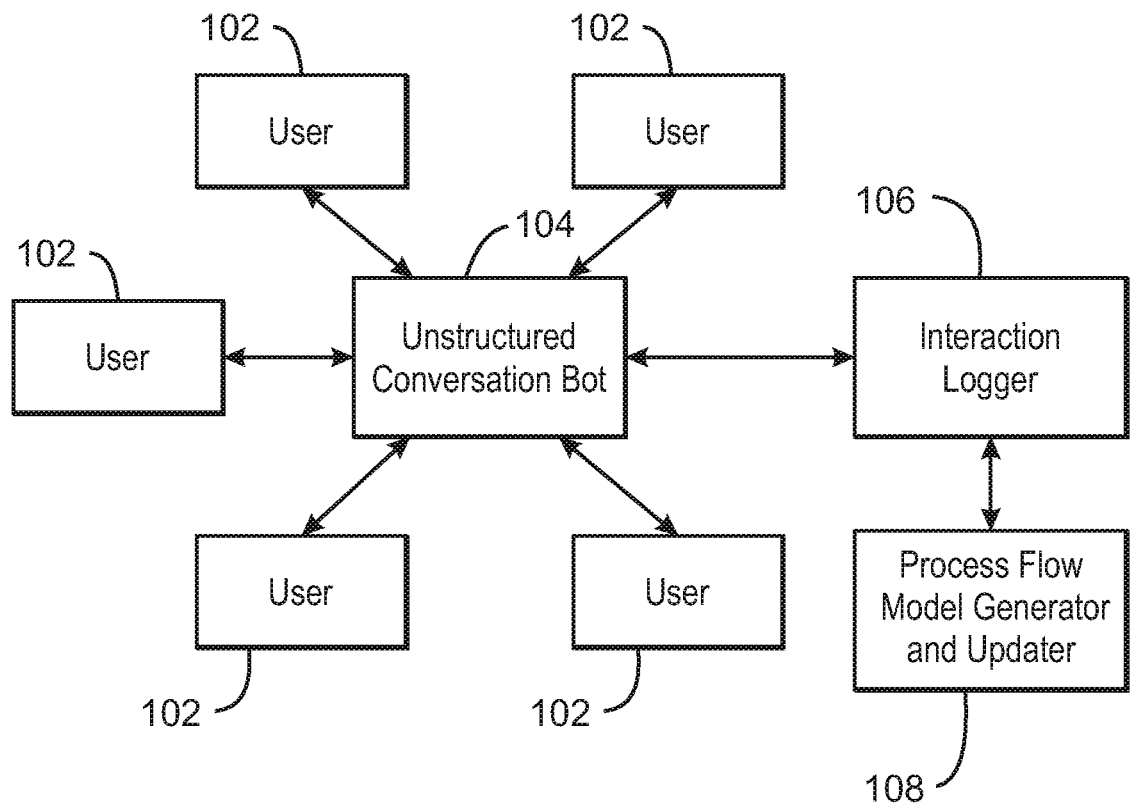
FIG. 1 is a block diagram of an example system for generating process flow models based on logged unstructured interactions.

Workers in various environments across different industries may engage in numerous processes on a daily basis. These processes are often characterized as routine and repetitive sequences of micro-operations which are carried on in a predefined order using either a paper form or an electronic form. One example of such a process is an inspection workflow in which a user performs a series of tests and examinations on a condition of a system, records states and sensor readings, and applies maintenance routines on the system components.

However, the particular order or flows in which these processes are carried out, referred to herein as a process flows, may be artificially constrained by interfaces used to execute the process flows. For example, inspection forms which are used to carry out these processes are designed and built by subject matter experts in the relevant domain and may be built either based on a logical hierarchy order or based on an order that aggregates the data in a way that allows a supervisor to review it more easily. These forms may then be directly translated to some form of screen-based interface. However, the logical order imposed by this process may be misaligned or even contradict the natural order of the business process. For example, the natural order may be an optimal order in which the worker could have performed it had the worker not been bound to the order of the form. In some examples, the natural order may be a reflection of the physical or practical arrangement of the subject, but can also be influenced by the proficiency level of the worker in the specific task, by the habits and conveniences of the worker, and by other objective and subjective factors. Thus, workers may be obliged to conform to a non-natural order in fulfilling a process. As a result, their performance may be sub-optimal due to having to bridge a gap between the guided procedure and the de-facto procedure that might be most efficient to them. For example, a worker may either follow the form as-is and compromise their efficiency, or carry out the procedure in the natural order but compromise the accuracy of the task.

According to embodiments of the present disclosure, an unstructured conversation bot can be used to generate process flow models based on logged unstructured interactions. An example system includes a processor to log unstructured interactions between an unstructured conversation bot and a plurality of users. For example, unstructured interactions may have no particular ordering. Unstructured interactions may thus not follow a specified pattern or structure of conversation and users may thus be not following a guided path led by the conversation bot. The processor can generate a process flow model based on the logged unstructured interactions. The processor can also present, via the conversation bot, instructions to a user in real time based on the process flow model. In some examples, the processor can modify the process flow model based on unstructured interactions with a user to be tailored to a preference of the user. Thus, embodiments of the present disclosure enable the generation of process flow models that are customized to the individual preferences of a particular worker or group of workers. Moreover, by using unstructured conversation bot data, the process flow model generated may be tailored to a specific process by the actual group of workers working on the task. The techniques may thus be used to generate process flow models that improve efficiency while maintaining accuracy of processes as they are being performed. In some examples, the system may continuously learn even with the new process flow model in order to optimize the efficiency of the workflow. The system may thus enable generating recommendations to workers with individually preferred orders to change their habits and examine an alternative order which is favorable by the general population of workers and is comparatively better than theirs, thus also serving as an education tool. In this way, the techniques may enable a conversation bot to effectively identify and gradually modify inefficient habits of groups of workers, while maintaining accuracy of the process flow.

With reference now to FIG. 1, a block diagram shows an example system for generating process flow models based on logged unstructured interactions. The example system 100 can be used to implement the process 200 or the method 300 of FIGS. 2 and 3. The system 100 can also be implemented using the computing device 400 of FIG. 4 or the computer-readable medium 700 of FIG. 7.

The system 100 of FIG. 1 includes a number of users 102 shown interacting with an unstructured conversation bot 104. For example, the unstructured conversation bot may implemented on a number of mobile devices. The mobile devices may include voice based personal assistant that provides unstructured feedback. The system 100 includes an interaction logger 106 to log the interactions between the users 102 and the unstructured conversation bot 104. As one example, the interaction logger 106 may be a sub-unit of the unstructured conversation bot 104. The system 100 includes a process flow model generator and updater 108. For example, the process flow model generator and updater 108 may be implemented on a service, such as a cloud server.

In the example of FIG. 1, a number of users 102 may be engaged in performing a particular process. For example, the process may include a series of tests and examinations on a condition of a system, and recording states and sensor readings and applying maintenance routines on the system components. In various examples, the unstructured conversation bot 104 may include a voice based interface. For example, the voice based interface may allow users to ignore any artificial barriers imposed by other traditional interfaces, and carry out a process in the manner most efficient to the user. The system 100 may thus allow users to fulfill processes using voice interactions in a natural language and in a natural order. The order of the process is un-structured and allows the users to fulfill the process in an un-guided manner.

Still referring to FIG. 1, the system 100 can log the users input in the order which they performed each process. Logging user interaction may allow the system to learn from this data and develop a generic model describing the optimal order for the relevant business process. The system will further learn the individually preferred order of each worker and apply this personalization onto the generic model in order to create an individual model for each worker and for each business process type. The interaction logger 106 may be any logging device for performing the process allowing the recording of the items, time, and location as the process is being performed. As one example, the workers may use a mobile hand-held device with a microphone and speaker and internet connectivity. The mobile device may include a voice interface application allowing the workers to conduct the process. In various examples, the collection of data is thus based on an online voice enabled tracking and logging device, such as a personal assistant running on a mobile or radio hand-held device. In some examples, the logging devices record the workflow procedure and transfer the log data online to a central database. In some examples, the logging device may transfer the log data offline after the process ends to the central database.

The process flow generator and updater 108 may include a learning algorithm that processes the data in the database in order to classify optimal routes or the best order to carry out the process, resulting in an optimal recommended order. In various examples, the system can learn optimized models over time as logged events are accumulated. For example, the logged events may describe the performance of each process item along with timing and location data associated with each item. The timing and location data may be collected by the end-users input device. In various examples, an optimized model may include a statistical analysis of the correlation between the traversal path of a conversation, indicated by the order of the conversation nodes, and the successful or efficient completion of the process flow. This analysis can highlight the best paths and retrace their common attributes in order to generate an optimal recommended order.

In some examples, an optimal recommended order can be achieved using various machine learning models. For example, a system can be used that includes a Random Forest model ingesting as input a multitude of attributes describing various steps in the conversation in the order which they were conducted. In various examples, the Random Forest model also ingests performance metrics such as the quality, speed and efficiency of completing the task. Over time, the Random Forest model can learn an ideal set of attributes and their order in order to reach the optimal result.

After learning an optimal model for each business process type, the system 100 can generate a process flow model based on the learned model, which can be used in subsequent processes. The system 100 can continuously learn even with the new process flow model in order to optimize the efficiency of the workflow. In various examples, the system 100 can recommend workers with an individually preferred order to change their habits and enable the workers to examine an alternative order which is favorable by the general population of workers and may be comparatively better than theirs. Thus, the system 100 can improve the efficiency of workers by feeding back the learned order into the individual logging devices for subsequent workflows.

In some examples, any individual deviations from the generated process flow model are logged as an individual preference and analyzed to identify clustered behavior and to quantify whether these new routes or orders are better than the current recommended scheme of the process flow model. If the new routes or orders are improved, then the system 100 may add the new improved route or order to the general model and update the process flow model accordingly. The resulting flow and order of the process is organized based on the de-facto order of the process along with performance information of numerous workflow instances and is best suited for the task type being performed by the workers. In various examples, with regard to the original default order of the process, which may be more hierarchically structured to suit a supervisor's view, the system 100 can still transform the new order of items back into the original logical default order to meet both user's perspectives and preferences, depending on a particular application.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
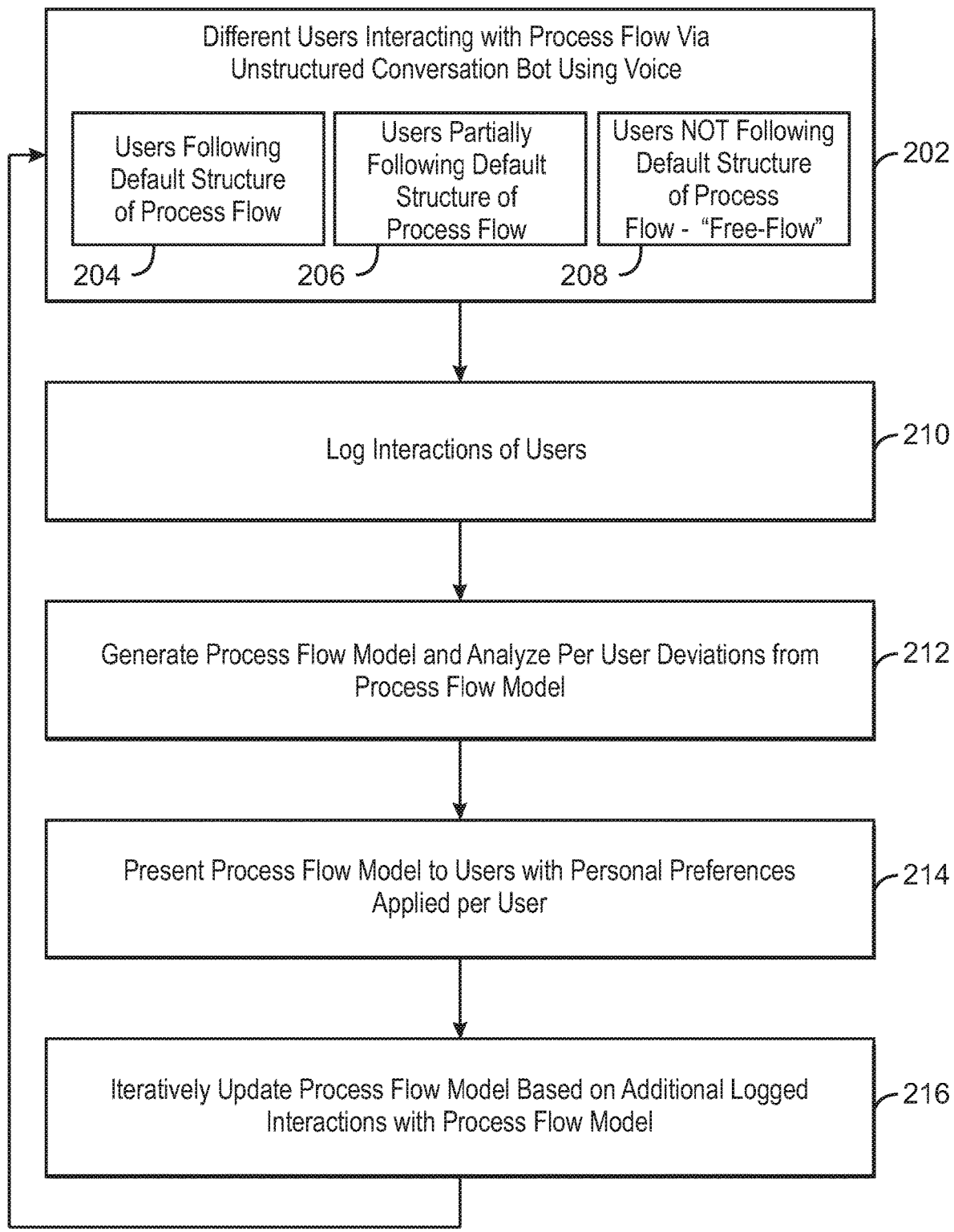
FIG. 2 is a process flow diagram of an example process that can generate process flow models based on logged unstructured interactions.

FIG. 2 is a schematic diagram of an example process that can generate process flow models based on logged unstructured interactions. The process 200 can be implemented with any suitable computing device, such as the computing device 400 of FIG. 4 and is described with reference to the system 100 of FIG. 1. For example, the methods described below can be implemented by the processor 402 or the processor 702 of FIGS. 4 and 7.

FIG. 2 includes a set of different users 202 interacting with a process flow via an unstructured conversation bot using voice. The different users 202 include a user 204 following a default structure of the process flow. For example, users 204 may be following a process on a form word by word or following verbal commands or cues, or visual commands or cues, as they are presented to the workers 204. The different users 202 include users 206 partially following the default structure of the process flow. The different users 202 also include free-flow users 208 not following the default structure of the process flow. For example, such free-flow users 208 may be deviating completely from a sequence of the default structure of the process flow.

At block 210, the interactions of the users 202 are logged. For example, the interactions with the unstructured may be logged and sent to a central database.

At block 212, a model generator generates a process flow model based on the logged interactions and analyzes per user deviations from the process flow model. For example, the model generator may determine if any of the per user deviations from the processor flow model exceed an efficiency of the process flow model. For example, the efficiency can be measured using the time it takes to carry out the process flow. In some examples, a secondary metric of efficiency may be the quality of the completion which may be measured by an external observer. Additionally, in some examples, a frustration of the users from the process may be measured using surveys, a physical distance travelled in the process, among other frustration metrics where applicable.

At block 214, the system presents the process flow model to the users with individual preferences applied per user. For example, the generated process flow model may be used as a generic process flow model with which the workers can interact with via the unstructured conversation bot. In some examples, an ordering or sequence of the generic process flow model may be modified based on the individual preferences of a user and presented to the user in an individual process flow model.

At block 216, the system iteratively updates the process flow model based on additional logged interactions with the process flow model. For example, the system can identify clustered behavior in the additional logged unstructured interactions and update the process flow model based on the clustered behavior in response to detecting that the clustered behavior comprises an improved route or order. In this way, the process flow model may be continuously improved over time based on the type of process and the preferences of the workers performing the process. Thus, efficiency may be improved while maintaining accuracy of execution of the process.

The schematic diagram of FIG. 2 is not intended to indicate that the operations of the process 200 are to be executed in any particular order, or that all of the operations of the process 200 are to be included in every case. Additionally, the process 200 can include any suitable number of additional operations.

Figure 3:
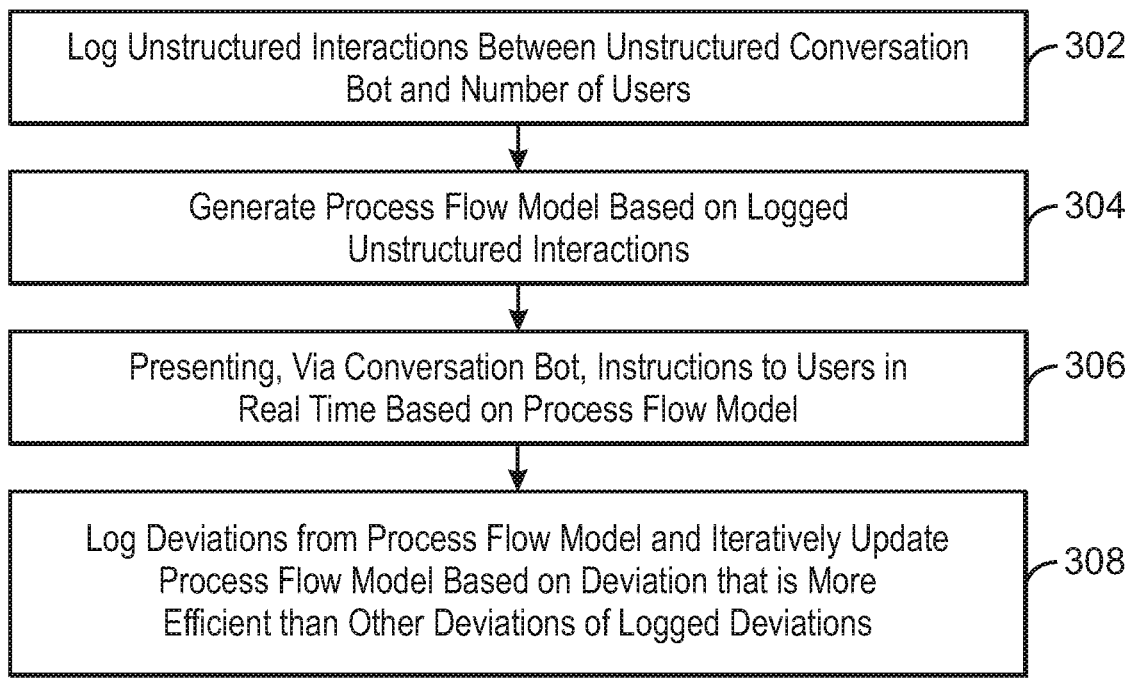
FIG. 3 is a process flow diagram of an example method that can generate process flow models based on logged unstructured interactions.

FIG. 3 is a process flow diagram of an example process that can generate process flow models based on logged unstructured interactions. The method 300 can be implemented with any suitable computing device, such as the computing device 400 of FIG. 4 and is described with reference to the systems 100 of FIG. 1. For example, the methods described below can be implemented by the processor 402 or the processor 702 of FIGS. 4 and 7.

At block 302, unstructured interactions between an unstructured conversation bot and a plurality of users are logged. In some examples, the interactions with the unstructured are logged and sent to a database. For example, the logged interactions may be sent to a central database in an offline or an online manner as discussed in FIG. 1.

At block 304, a process flow model is generated based on the logged unstructured interactions. For example, a generic process flow model may be generated for a particular type of process flow based on interactions of users performing the particular type of process flow. In some examples, generated the process flow model may include comparing paths of execution of the plurality of users and selecting a path that is more efficient than other paths.

At block 306, instructions based on the process flow model are presented to a user in real time via the conversation bot. In various examples, views of the process flow model may be generated from different perspectives and presented. In some examples, a top down model view or a ground level view may be generated and presented. A top down model view is a view which depicts a certain logical hierarchy arrangement of the data. The top down model allows drilling down from a top-level data elements into its subsidiary data elements, recursively. Alternatively, the top down model allows collapsing lower level data elements by grouping them into higher order data elements again and again. In various examples, the top down model view may be presented to supervisors. The top down model view may be generated based on a default process flow model. In various examples, the ground level view may be generated based on the process flow model. A ground level view is a view depicting the actual arrangement of the data elements as it is reflected by the person performing a hands-on operation. The ground level view does not have to conform to any logical hierarchy but rather aligns with a natural order of traversal as the individual and environment are most likely or suitable to perform a process. For example, the ground level view may be presented to users.

At block 308, deviations from the process flow model are logged and the process flow model is iteratively updated based on a deviation that is more efficient than other deviations of the logged deviations. In some examples, individual deviations from the process flow model may be logged for each of the plurality of users and an individual model generated for each of the users based on the logged individual deviations for each of the plurality of users. In various examples, clustered behavior is identified in additional logged unstructured interactions and the process flow model is updated based on the clustered behavior in response to detecting that the clustered behavior comprises an improved route or order. Clustered behavior, as used herein, refers to similar or identical patterns in the entire process flow or in parts of the process flow. In some examples, these patterns may be a series of conversation steps of process flow actions that are occurring in a certain order.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
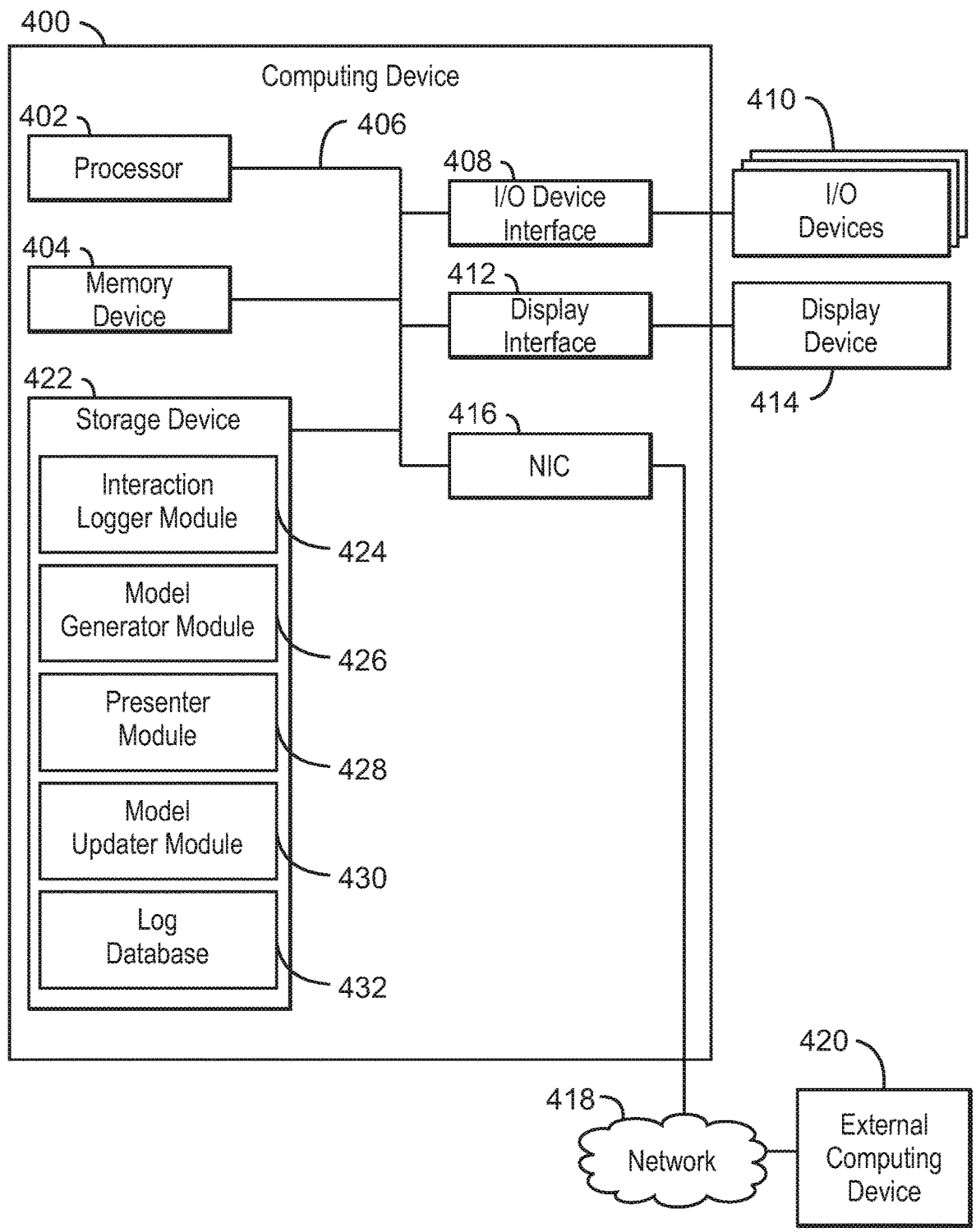
FIG. 4 is a block diagram of an example computing device that can generate process flow models based on logged unstructured interactions.

FIG. 4 is block diagram of an example computing device that can generate process flow models based on logged unstructured interactions. The computing device 400 may be for example, a server, desktop computer, laptop computer, tablet computer, or a mobile device, such as a smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include an interaction logger module 424, a model generator module 426, a presenter module 428, and a model updater module 430. The interaction logger module 424 can log unstructured interactions between an unstructured conversation bot and a plurality of users. For example, the interaction logger module 424 may be a voice based interface on a mobile device. In some examples, the data included in the logged unstructured interactions comprises location data and time stamps. The interaction logger module 424 can also log individual deviations from the process flow model for each of the plurality of users. The model generator module 426 can generate a process flow model based on the logged unstructured interactions. In some examples, model generator module 426 can generate an individual model for each of the users based on the logged individual deviations. The presenter module 428 can present, via the conversation bot, instructions to a user in real time based on the process flow model. In various examples, the presenter module 428 can generate and present views of the process flow model from different perspectives. For example, the views may include a ground level view and a hierarchical top down view. The model updater module 430 can iteratively update the process flow model based on a deviation that is more efficient than other deviations of the logged deviations.

The storage device 422 may also include a log database 432 to store logged interactions with various users. For example, the log database 432 may store location data, times, and orders of interactions with the users. For example, the log database 432 may store location data, interaction time and duration, interaction content including user input and system output, the an interpretation of the interaction by the system, and a resulting action of the interaction. The sequential order and additional information may also be inferred from the logged data and may also be stored in the log database 432.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the interaction logger module 424, the model generator module 426, and the model updater module 428 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the interaction logger module 424, model generator module 426, presenter module 428 and model updater module 430 can be implemented with logic, wherein the logic, as referred to herein, can include any suitable hardware (e.g., a processor, among others), software (e.g., an application, among others), firmware, or any suitable combination of hardware, software, and firmware.

In some scenarios, the techniques described herein may be implemented in a cloud computing environment. As discussed in more detail below in reference to at least FIGS. 5-6, a computing device configured to generate process flow models based on logged unstructured interactions may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
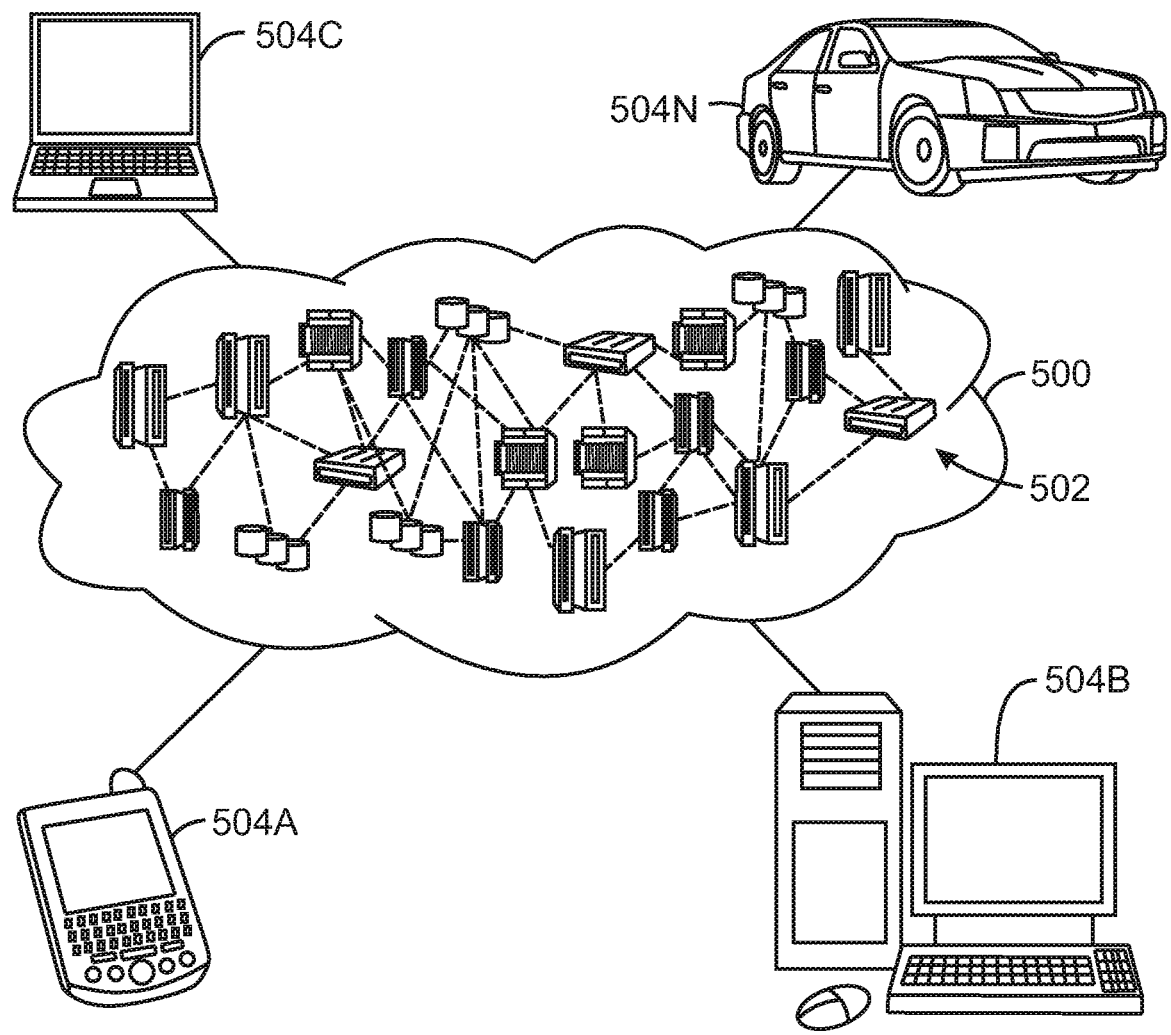
FIG. 5 is a process flow diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
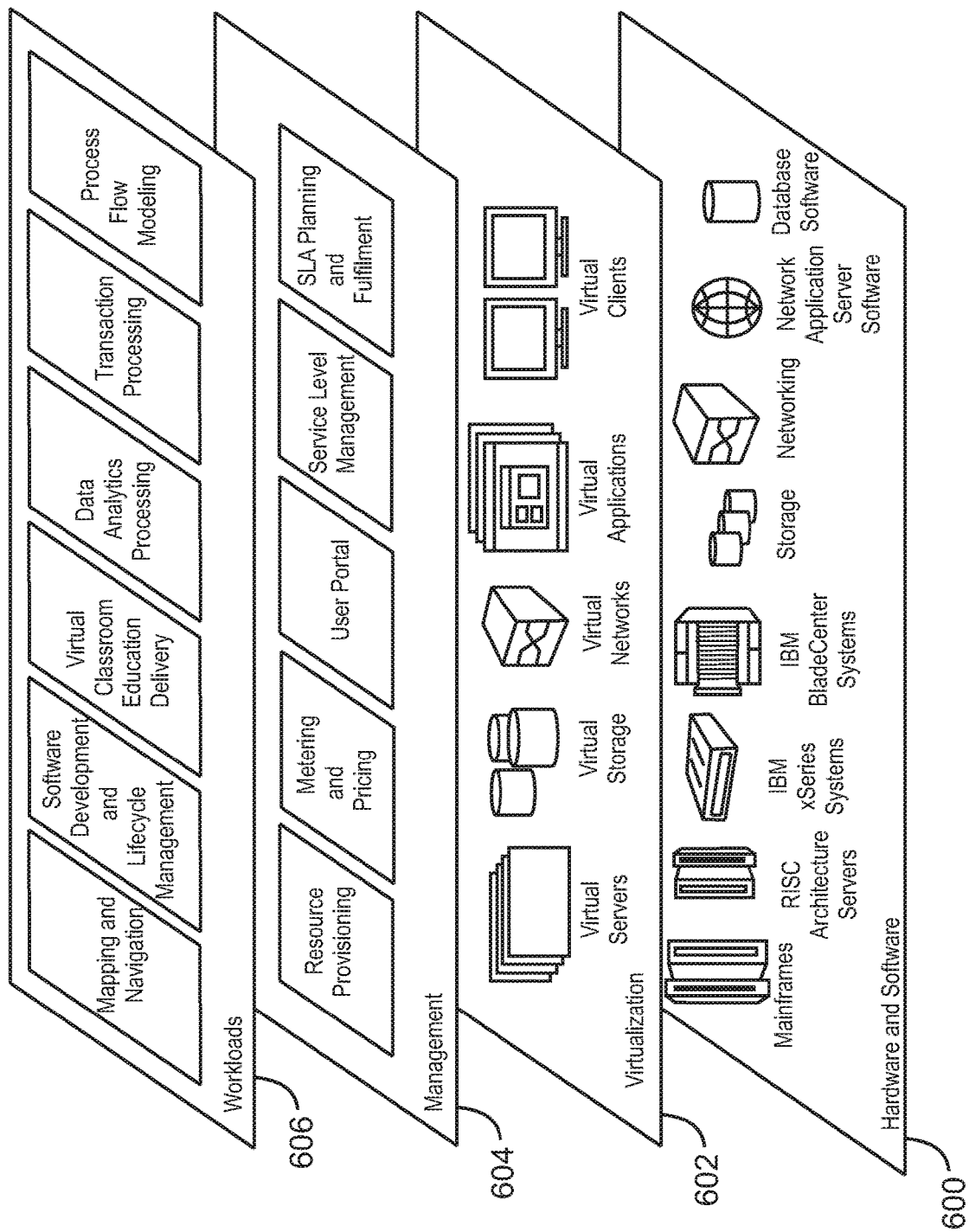
FIG. 6 is a process flow diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and process flow modeling.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
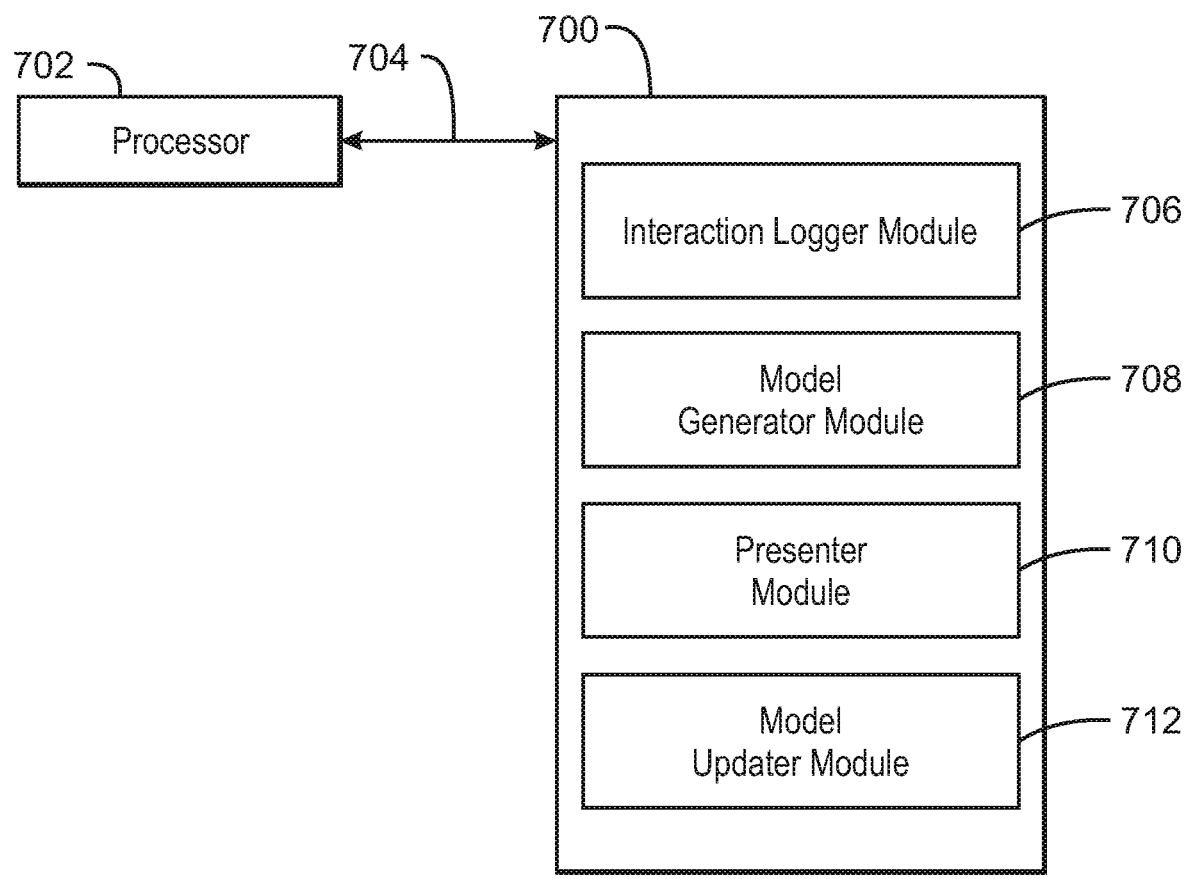
FIG. 7 is an example tangible, non-transitory computer-readable medium that can generate process flow models based on logged unstructured interactions.

Referring now to FIG. 7, a block diagram is depicted of an example tangible, non-transitory computer-readable medium 700 that can generate process flow models based on logged unstructured interactions. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, an interaction logger module 706 includes code to log unstructured interactions between an unstructured conversation bot and a plurality of users. The interaction logger module 706 also includes code to log deviations from a process flow model. In some examples, the interaction logger module 706 includes code to log individual deviations from the process flow model for each of the plurality of users. In some examples, the interaction logger module 706 includes code to. A model generator module 708 includes code to generate a process flow model based on the logged unstructured interactions. The model generator module 708 includes code to generic process flow model for a particular type of process flow based on interactions of users performing the particular type of process flow. For example, the model generator module 708 can include code to compare paths of execution of the plurality of users and selecting a path that is more efficient than other paths. The model generator module 708 further includes code to generate an individual model for each of the users based on the logged individual deviations. A presenter module 710 includes code to present, via the conversation bot, instructions to a user in real time based on the process flow model. The presenter module 710 also includes code to generate and present views of the process flow model from different perspectives. A model updater module 712 includes code to iteratively update the process flow model based on a deviation that is more efficient than other deviations of the logged deviations. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   log unstructured interactions between an unstructured conversation bot on a mobile device and a plurality of users to generate logged events comprising a performance of each process item along with a timestamp of each process item and physical location data of the mobile device associated with each process item;
   learn, via a machine learning model that receives the logged events as input attributes, a recommended order for a process, wherein the recommended order comprises a set of selected attributes and an order of execution for the set of selected attributes;
   generate a process flow model for the process based on the machine learning model; and
   present, via the conversation bot, instructions to a user in real time based on the process flow model.

2. The system of claim 1, wherein the conversation bot comprises a voice based interface on the mobile device.

3. The system of claim 1, wherein the processor is to generate and present views of the process flow model from different perspectives.

4. The system of claim 3, wherein the views comprise a ground level view and a hierarchical top down view.

5. The system of claim 1, wherein data included in the logged unstructured interactions comprises location data and time stamps.

6. The system of claim 1, wherein the processor is to log individual deviations from the process flow model for each of the plurality of users and generate an individual model for each of the users based on the logged individual deviations.

7. The system of claim 1, wherein the processor is to log deviations from the process flow model and iteratively update the process flow model based on a deviation that is more efficient than other deviations of the logged deviations.

8. A computer-implemented method, comprising:
   logging, via a processor, unstructured interactions between an unstructured conversation bot on a mobile device and a plurality of users to generate logged events comprising a performance of each process item along with a timestamp of each process item and physical location data of the mobile device associated with each process item;
   learning, via a machine learning model that receives the logged events as input attributes, a recommended order for a process, wherein the recommended order comprises a set of selected attributes and an order of execution for the set of selected attributes;
   generating, via the processor, a process flow model for the process based on the machine learning model; and presenting, via the conversation bot, instructions to a user in real time based on the process flow model.

9. The computer-implemented method of claim 8, further comprising logging deviations from the process flow model and iteratively updating the process flow model based on a deviation that is more efficient than other deviations of the logged deviations.

10. The computer-implemented method of claim 8, comprising logging individual deviations from the process flow model for each of the plurality of users and generating an individual model for each of the users based on the logged individual deviations for each of the plurality of users.

11. The computer-implemented method of claim 8, wherein generating the process flow model comprises generating a generic process flow model for a particular type of process flow based on interactions of users performing the particular type of process flow.

12. The computer-implemented method of claim 8, wherein generating the process flow model comprises comparing paths of execution of the plurality of users and selecting a path that is more efficient than other paths.

13. The computer-implemented method of claim 8, comprising generating and presenting views of the process flow model from different perspectives.

14. The computer-implemented method of claim 8, further comprising identifying clustered behavior in additional logged unstructured interactions and updating the process flow model based on the clustered behavior in response to detecting that the clustered behavior comprises an improved route or order.

15. A computer program product for generating process flow models, the computer program product comprising a computer-readable storage medium having program code embodied therewith, wherein the computer-readable storage medium is not a transitory signal per se, the program code executable by a processor to cause the processor to:

log unstructured interactions between an unstructured conversation bot on a mobile device and a plurality of users to generate logged events comprising a performance of each process item along with a timestamp of each process item and physical location data of the mobile device associated with each process item;

learn, via a machine learning model that receives the logged events as input attributes, a recommended order for a process, wherein the recommended order comprises a set of selected attributes and an order of execution for the set of selected attributes;

generate a process flow model for the process based on the machine learning model; and present, via the conversation bot, instructions to a user in real time based on the process flow model.

16. The computer program product of claim 15, further comprising program code executable by the processor to log deviations from the process flow model and iteratively update the process flow model based on a deviation that is more efficient than other deviations of the logged deviations.

17. The computer program product of claim 15, further comprising program code executable by the processor to log individual deviations from the process flow model for each of the plurality of users and generate an individual model for each of the users based on the logged individual deviations.

18. The computer program product of claim 15, further comprising program code executable by the processor to generate a generic process flow model for a particular type of process flow based on interactions of users performing the particular type of process flow.

19. The computer program product of claim 15, further comprising program code executable by the processor to compare paths of execution of the plurality of users and selecting a path that is more efficient than other paths.

20. The computer program product of claim 15, further comprising program code executable by the processor to generate and present views of the process flow model from different perspectives.

\* \* \* \* \*